United States Patent Office 3,361,844
Patented Jan. 2, 1968

3,361,844
POLYURETHANE/POLYUREA PRODUCT AND
PROCESS FOR PREPARING SAME
Guenther Kurt Hoeschele, Wilmington, Del., assignor to
E. I. du Pont de Nemours and Company, Wilmington,
Del., a corporation of Delaware
No Drawing. Filed Dec. 14, 1964, Ser. No. 418,257
15 Claims. (Cl. 260—858)

ABSTRACT OF THE DISCLOSURE

Applicant's invention is directed to the production of a polyurethane/polyurea product by reacting an organic difunctional isocyanato-terminated component with a difunctional amino-terminated component as more specifically described and claimed hereinafter, the molecular weights of said components being such that said number average molecular weight for the units between urea groups is obtained. A fluid composition produced by this improved process is also part of the present invention.

---

This invention relates to a new composition for chain-extending diisocyanates to useful polymeric products.

It is well known that polyurethane compositions, ranging from relatively soft elastomers to hard materials, which might be described as plastics, can be prepared by chain-extending isocyanate-terminated prepolymers with arylene diamines. In order to effect thorough mixing of the prepolymer and the diamine, it is customary to warm the prepolymer to reduce its viscosity and to melt the diamine curing agent. For many compositions and applications this manner of mixing is acceptable. However, when preparing large molded items or when using prepolymers containing a relative high concentration of isocyanato groups, difficulties may be encountered because of the high temperatures resulting from bringing such reactive materials together at elevated temperatures. On many occasions, the rate of reaction is so great that time is not available to permit thorough mixing and casting before the composition begins to gel. Even when the casting operation is successful, subsequent setting of the composition may take place at such high temperatures that appreciable shrinkage occurs when the article finally cools to room temperature. These problems are particularly serious in tooling applications requiring hard products where it is necessary to use high concentrations of isocyanato groups and the shrinkage encountered following curing prevents meeting close tolerances. These problems exist even with commonly used diamines of low reactivity such as 4,4'-methylene-bis(2-chloroaniline) and 3,3'-dichlorobenzidine.

Recognition of these problems has resulted in the suggestion of a variety of procedures which would avoid the high temperatures required for melting preferred diamine curing agents or minimize the temperature effects. In one technique, diamine curing agent is mixed into the prepolymer in the form of a finely divided solid. The pasty mixture produced can be placed in molds without gelling prematurely, but this scheme fails to eliminate the high temperatures reached during cure because the mixture must still be heated to about the melting point of the diamine to initiate curing. The addition of inert fillers has been employed to control the maximum temperature reached during curing. This reduces shrinkage but often increases the problem of filling molds properly. Furthermore, the presence of fillers may be detrimental to physical properties. Mixed glycol/triol/diamine cures have been suggested to reduce the rate of heat evolution, but the chain extended products lack the toughness exhibited by straight diamine cures. Solutions or suspensions of diamine curing agents in plasticizers such as dioctyl phthalate have been used to avoid the necessity for melting the diamine, but the plasticizer reduces the toughness of the polyurethanes. In addition, most plasticizers have a tendency to exude from the polyurethane. This is true even with high molecular weight plasticizers which are structurally similar to the glycol portion of the polyurethane, such as the diacetate of polypropyleneether glycol (molecular weight 1000). Polymeric glycols have been used as "reactive" plasticizers which are chemically bound into the final cured product, but the products exhibit much of the decrease in toughness associated with glycol/triol cures. Furthermore, the difference in the reactivity of glycols and amines may interfere in obtaining satisfactory cures.

It is therefore an object of the present invention to provide a low temperature melting chain-extending composition for diisocyanato-terminated compounds, the use of this composition avoiding the problems hereinbefore discussed. Other objects will appear hereinafter.

In one aspect of the present invention, the process of contacting and reacting a difunctional isocyanato-terminated prepolymer with arylene diamine to chain extend said prepolymer to form a polyurethane/polyurea product is improved upon by carrying out the contacting and reacting step with a difunctional amino-terminated fluid chain-extending composition consisting essentially of said arylene diamine having a pKb of at least 8.7 and a diamino-polyurethane having the formula

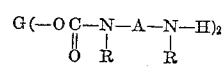

wherein —G— is a bivalent radical which may be obtained by removing the hydroxyl groups of a glycol, —A— is an inert biradical which may be obtained by removal of the amino groups from a diamine, with the proviso that the terminal amino groups are aromatic, and R is selected from the group consisting of hydrogen and $C_1$–$C_4$ alkyl, with said composition containing not less than about 10% of its weight of said diamino-polyurethane and at least 0.20 equivalents of arylene diamine of pKb of at least 8.7 per equivalent of said composition. The preferred diamine from which —A— is derived is an arylene diamine, which need not be the same as that having the specified pKb.

The present invention is not limited to chain-extending prepolymers but may also be applied to the preparation of polymers from simple diisocyanate compounds, i.e., an aliphatic or aromatic biradical nucleus bearing two isocyanate groups, as well. It is known that units between urea groups in useful polyurethane products have a number average molecular weight of between about 250 to about 2500. Therefore, the molecular weight of the glycol residue, —G—, of the diaminopolyurethane should be sufficient so that the number average molecular weight of the units in the product satisfies this range.

The number average molecular weight of units between urea groups is calculated as follows:

If a polymer is prepared by reacting two moles of 4,4'-methylenebis(cyclohexyl isocyanate) with a diamine composition of (a) 1 mole of 4,4'-methylenebis(2-chloroaniline) and (b) 1 mole of the diamino-polyurethane which is obtained by reacting 1 mole of the bischloroformate of polytetramethyleneether glycol having a molecular weight of 1000 with 2 moles of 4,4'-methylenebis(2-chloroaniline), the number average molecular weight of the units between urea groups in the polymer is 536. This value is obtained by adding twice the molecular weight of the diisocyanate, less the weight of its isocyanate groups, to the molecular weights of the diamino-polyurethane and arylene diamine, less the weight of their amino groups, and dividing by the total number of moles as follows:

$$\frac{2(178)+1554+235}{4}=536$$

In the same way, a value for the number average molecular weight of units between urea groups of 1013 is obtained for a product resulting from reacting 3 moles of a difunctional isocyanato-terminated prepolymer prepared from 3 moles of polytetramethyleneether glycol having a molecular weight of 1000 and 6 moles of 2,4-tolylene diisocyanate with a diamino composition consisting of (a) 1 mole of the diaminopolyurethane obtained by reacting 1 mole of the bischloroformate of diethylene glycol with 2 moles of 4,4'-methylenebis(2-fluoroaniline), (b) 1 mole of the diamino-polyurethane obtained by reacting 1 mole of the bischloroformate of polytetramethyleneether glycol having a molecular weight of 1000 with 2 moles of 4,4'-methylenebis(2-fluoroaniline) and (c) 1 mole of 4,4'-methylenebis(2-fluoroaniline). The calculation is as follows:

$$\frac{3(1264)+594+1488+202}{6}=1013$$

The diamino-polyurethanes of the present invention are generally useful, together with the prescribed arylene diamine, to react with an essentially difunctional isocyanato-terminated component, including glycol/diisocyanate reaction products which fall short of being a prepolymer, with the proviso that the glycol portion of either the isocyanate component, if it has such a portion, or of the diamino-polyurethane of the difunctional amino-terminated reacting component is selected so that the number average molecular weight of the units resulting from the condensation between one mole of each component is between about 250 to about 2500. The amine component may be present in a sufficient amount to react with all of the isocyanato groups or less depending on the properties desired for the polyurethane/polyurea product. Typically, from 0.7 to 1.05 equivalents of this component is supplied for each equivalent of isocyanate component.

The fact that the amine component is low melting and liquid, permits mixing with the isocyanate component at low temperatures to thereby increase the pot life, reduce the cure shrinkage, and simplify processing. Further, by increasing the ratio of arylene diamine to diamino-polyurethane, a series of polymer products exhibiting increasing modulus and hardness can be prepared from a single isocyanate component such as a prepolymer, whereby products ranging from elastomers to plastics can be obtained.

The isocyanate component required for the preparation of the present compositions may vary considerably in molecular weight and structure. The isocyanato groups contained therein may be attached to aromatic, aliphatic or cycloaliphatic nuclei. Often the isocyanate component will be a mixture of these types of compounds.

Any of the aromatic diisocyanates employed in preparing prior art polyurethane elastomers may be used as such or for the preparation of prepolymers. Representative of these diisocyanates are tolylene-2,4-diisocyanate, tolylene-2,6-diisocyanate and mixtures thereof, methylenebis(4-phenylisocyanate) and its alkyl and alkoxy substituted derivatives and 1,3- and 1,4-phenylene diisocyanates. Ring halogenated derivatives of these aromatic diisocyanates may be of use on occasion. Tolylene diisocyanates and methylenebis(4-phenylisocyanate) are preferred.

Representative aliphatic diisocyanates including cycloaliphatic diisocyanates, for use as such or in prepolymers, include 1,4-tetramethylene diisocyanate, 1,6-hexamethylene diisocyanate, 1,3- and 1,4-cyclohexyl diisocyanates, methylenebis(4-cyclohexylisocyanate) and 1,3- and 1,4-xylylene diisocyanates. Of these, hexamethylene diisocyanate and methylenebis(4-cyclohexylisocyanate) are preferred, with the latter being especially preferred for the preparation of hard compositions useful for tooling applications. Mixed aliphatic-aromatic diisocyanates such as 4-isocyanatobenzyl isocyanate are also of use in preparing certain compositions included by this invention.

Methylenebis(4-cyclohexylisocyanate) and its parent diamine can exist in the form of three geometrical isomers because the isocyanato (or amino) group on either cyclohexane ring can be cis or trans relative to the methylene group connecting the cyclohexane rings. These geometrical forms, namely, the trans-trans, the cis-trans and the cis-cis, are obtained in varying proportions from the hydrogenation of 4,4'-methylene dianiline. These geometrical isomers may be obtained in pure form by conventional physical separation techniques, but commercial grades of this diisocyanate normally are mixtures containing all three forms. Either pure geometrical isomers or mixtures of isomers may be used in preparing the compositions of this invention.

Prepolymers which may be used as all or part of the isocyanate component are prepared by reacting an excess of a diisocyanate with a glycol. Either aromatic or aliphatic diisocyanates may be used. Representative compounds of both diisocyanate types have been listed hereinbefore. As the glycol reactant, that which is conventional in the polyurethane art, including polymeric glycols, low molecular weight glycols and mixtures thereof may be used. Examples of suitable polymeric materials include polyalkyleneether glycols, and polyester glycols, with polytetramethyleneether glycol being preferred. Representative low molecular weight hydroxyl compounds include butanediol-1,3, butanediol-1,4, diethylene glycol, dipropylene glycol, neopentyl glycol and cyclohexanediol-1,4. Since the urethanes prepared from low molecular weight glycols often are relatively high melting solids or viscous liquids, it is preferred to use them in admixture with prepolymers derived from a polymeric glycol or to employ a very large excess of diisocyanate in their preparation so that sufficient free diisocyanate remains to function as a solvent for the derivative. In preparing prepolymers of polymeric hydroxyl compounds the quantity of diisocyanate employed generally should provide 1.4 or more isocyanato groups for each hydroxyl group in order to produce a product having a low enough viscosity to be processable. When more than 1 mole of diisocyanate is used per equivalent of hydroxyl groups, the prepolymer formed will contain significant amounts of uncombined diisocyanate.

The reaction of diisocyanates with hydroxyl compounds to form prepolymers is well known. The preparation may be accomplished by mixing the selected hydroxyl compounds or compound with an excess of diisocyanate at temperatures below about 100° C. Following the mixing, the reaction mass is heated until the isocyanato group content falls to an essentially constant value. Reaction times of 2–4 hours at 80° C. generally are adequate with aromatic diisocyanates. Aliphatic diisocyanates may require somewhat longer heating periods because of their lower reactivity. Prepolymer formation can be accelerated by the use of conventional organo-tin catalysts such as stannous octanoate or dibutyltin dilaurate.

The isocyanate component may contain minor amounts of compounds which have three or more isocyanato groups. Compounds of this type may be provided by aromatic or aliphatic triisocyanates of which 2,4,6-toluene triisocyanate, 2,2',4-triisocyanatodiphenyl ether, 4,4',4"-triisocyanatotriphenylmethane and 2,2',4-triisocyanatodicyclohexylmethane are representative. Alternatively, tri- or higher functionality may be provided by preparing isocyanato-urethanes from diisocyanates and triols or higher polyols. The triols or higher polyols may be low molecular weight compounds such as trimethylol ethane, trimethylol propane, glycerol, 1,2,6-hexanetriol, pentaerythritol and sorbitol or polymeric compounds such as polyalkyleneether polyols made by condensing alkylene oxides with low molecular weight polyols. Polyester polyols made by usual esterification procedures in which some tri-functional polyol or carboxylic acid is included may also be used.

The amine component is a mixture of (1) an arylene diamine having a pKb of at least 8.7 and (2) a diamino-polyurethane which may be represented by the general formula,

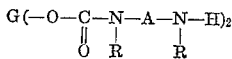

wherein —G— is a biradical inert towards isocyanato groups which may be obtained from a glycol,

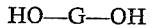

by removal of hydroxyl groups, —A— is an inert biradical which may be obtained from a diamine

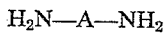

preferably from arylene diamine, and R may be hydrogen or $C_1$–$C_4$ alkyl. The free or terminal amino groups must be attached to an aromatic nucleus but the biradical

(when R is H) may be derived from either an aliphatic or aromatic primary amino group connected to the biradical —A—. Mixtures of these two types of diamines (1) and (2) may be used in the same applications normally employing conventional arylene diamine curing agents. In addition, these liquid or low melting mixtures may be used in preparing compositions having properties which were for practical purposes unattainable with prior art compositions using high melting arylene diamines. The amine components used in this invention appear to be liquid or low melting because the diamino-polyurethane acts as a solvent or plasticizer for the arylene diamine. In order to be effective in retarding or preventing solidification of the arylene diamine, the amine component should contain not less than about 10% by weight of diamino-polyurethane. In general, pure diamino-polyurethanes do not solidify; however, they are often viscous and may be difficut to handle. The addition of at least 0.2 equivalents of arylene diamine per equivalent of mixture as required by this invention reduces the viscosity of pure diamino-polyurethanes significantly. In addition, the diamine reduces any tendency of the diamino-polyurethane to crystallize.

As the arylene diamine portion of the amine component, one may use most of the diamines which have been employed in the past as chain-extending or curing agents to prepare prior art polyurethanes from isocyanato-terminated prepolymers. The term "arylene diamine" is used herein to indicate a compound in which each of two amino groups is attached to the same or to different benzene radicals or related polycyclic aromatic hydrocarbon radicals. The restriction of the diamines to those having a pKb of at least 8.7 excludes the use of diamines more basic than p-toluidine. Diamines having pKb values below about 8.7, that is more basic than p-toluidine, normally react so rapidly with isocyanate components that satisfactory mixing is difficult and heterogeneous products may be formed. A few derivatives of the phenylene diamines containing substituents which reduce basicity are suitable for use in this invention; for example, 2,5-dichlorophenylene-1,4-diamine. In general, compounds having two phenyl radicals, each substituted with an amino group, meet the basicity requirement and are more readily accessible than suitable phenylenediamine derivatives. This class of compounds having two phenyl radicals may be represented by the general formula

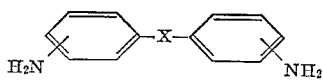

wherein X is a biradical of which

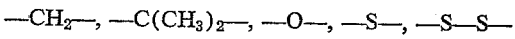

and phenylene are exemplary. X may also be omitted so that the phenyl radicals are joined together directly to provide a biphenyl radical. The amino groups shown in the general formula may be ortho, meta or para to the position of X and may be positioned differently on the two rings. However, compounds in which the amino groups occupy para positions are preferred because of their availability. Other substituents which are inert to isocyanate groups may also be present on the benzene nucleii. Suitable diamines of this class include 4,4′-methylenebis(2-methylaniline), 4,4 - diaminodiphenyldisulfide, 4,4′ - methylenedianiline, 4,4′-methylenebis(2-chloroaniline), 4,4′-diaminodiphenyl ether, 3,3′-dichlorobenzidine, 4,4′ - diamino-3-chloro-3′-bromodiphenylmethane, 4,4′-methylenebis(2-fluoroaniline), 4,4′ - isopropylidenedianiline, 4,4′-methylenebis(2-methoxyaniline), 2,6-dichloro-1,5-diaminonaphthalene, and 2,3-dichloro-1,4-diaminonaphthalene. Of these 4,4′-methylenebis(2-chloroaniline) is especially preferred.

For the diamino-polyurethane portion of the chain-extending or amine component, the radical —G— may be obtained by removing the hydroxyl groups from low molecular weight glycols such as butanediol-1,3, butanediol-1,4, neopentyl glycol, hexanediol-1,6, cyclohexanediol-1,4, decamethylene glycol and diethylene glycol. The radical —G— may also be obtained from a polymeric glycol of which polyethylene or polypropyleneether glycols, polytetramethyleneether glycols and polyester glycols are representative. These polymeric hydroxyl compounds may have molecular weights ranging from several hundred to several thousand as long as the requirement in regard to the molecular weight of the units between urea groups in the chain-extended product is met. It is not required that only one glycol be used in the form of its diamino-polyurethane. Mixtures representing combinations of low molecular weight glycols with one or more polymeric glycols may be used as well as combinations of polymeric glycols having different molecular weights. The biradical —G— also includes compounds which can be considered to be derived by the removal of hydroxyl groups from the glycols which in turn would result from reacting an excess of a glycol with an arylene diisocyanate to produce a hydroxyl-terminated prepolymer.

The arylene biradical, —A—, may be considered as being derived from any of the diamines described hereinbefore by the removal of the amino groups. There is, however, no restriction on the basicity of the diamines from which the diamine biradical can be derived so that radicals obtained from phenylene diamines and substituted phenylene diamines and substituted phenylene diamines are included. Thus, the isomeric biradicals obtainable from m-tolylene diamines are included. Secondary amines in which the amino groups of any of the diamines described hereinbefore have a hydrogen replaced with a $C_1$–$C_4$ alkyl radical are also included.

The diamino-polyurethanes which may be used in the amine component of the present compositions can be prepared in a variety of ways. The most convenient route to these compounds involves converting a suitable glycol or glycol mixture to the corresponding bis-chloroformate. Chloroformate formation may be effected by reacting the hydroxyl compound with an excess of liquid phosgene at temperatures around the boiling point of phosgene. The chloroformate so produced is converted to diamino-polyurethane by reaction with an excess of the selected diamine in the presence of an acid acceptor such as calcium oxide. The reaction is best performed in an inert organic solvent. If about two moles of diamine are used per mole of bischloroformate, the product will be mainly a diamino-diurethane. If less than two moles of diamine are used, the product will contain more or less diamino-polyurethanes. Diamino-polyurethanes may also be synthesized by reacting an excess of a diisocyanate with a hydroxyl compound followed by hydrolysis of the unreacted isocyanato groups in the presence of hydrochloric acid to yield amino groups. A further synthesis employs the reaction of a nitroisocyanate with a hydroxyl compound followed by catalytic hydrogenation of the dinitropolyurethane to provide the desired diamino-polyurethane.

A minor proportion of the amino groups in the amine component may be contained in compounds having three or more amino groups. Compounds for providing tri- or higher functionality may be relatively low molecular weight triamines such as 4,4′,4″-triaminotriphenylmethane or higher molecular weight triamines resulting from reacting the trischloroformate of a triol with an excess of diamine, for example.

While the compositions of this invention may be prepared from any of the starting materials recited hereinbefore, compositions based on polytetramethyleneether glycol, tolylene diisocyanates, 4,4′-methylenebis(cyclohexylisocyanate) and 4,4′-methylenebis(2-chloroaniline) are especially preferred. In addition to these materials, low molecular weight glycols such as 1,3- and 1,4-butanediol and diethylene glycol may be employed to advantage on occasion in the preparation of relatively hard compositions. The isocyanate components which may be derived from these preferred materials range from pure tolylene diisocyanate and/or 4,4′-methylenebis(cyclohexylisocyanate) up to prepolymers derived from these isocyanates and polytetramethyleneether glycol having an average molecular weight of between 750 and 3000. Prepolymers prepared from mixtures of low molecular weight glycols and polytetramethyleneether glycol are also useful. The amine components available with these materials are mixtures of 4,4′-methylenebis(2-chloroaniline) with diamino-polyurethanes derived from the bischloroformate of polytetramethyleneether glycol, optionally containing a low molecular weight glycol, and 4,4′-methylenebis(2-chloroaniline).

Selection of the materials to be used in the preparation of the compositions included in this invention depends largely on the properties desired. This is true with any of the materials disclosed before including the preferred starting materials listed in the preceding paragraph. While it is not possible to predict properties accurately in advance, it is known that if the molecular weight of the units between urea groups is low, the composition will be relatively hard. Conversely, when the molecular weight is high, relatively soft elastomers are produced. In this connection it is interesting to note that the present invention provides a more convenient route to very soft compositions than did the prior art method of curing prepolymers with a diamine. In preparing very soft compositions by the prior art method, prepolymers which had very low free isocyanato-group contents were required. Cured compositions derived from such prepolymers were soft because of their low concentration of urea linkages. These prepolymers were difficult to handle because of their high viscosity. By employing an amine component of this invention which contains a large proportion of a diamino-polyurethane derived from a polymeric glycol with a low viscosity prepolymer, a soft composition having a low concentration of urea linkages can be produced while avoiding the high viscosity of prior art prepolymers having low isocyanato-group contents.

Preparation of the liquid or low-melting amine component of the present invention involves mixing the selected arylene diamine and diamino-polyurethane in suitable proportions at a temperature sufficiently high to liquify the ingredients. Once the mixture has been formed it may be allowed to cool and stored until required. It should be noted that amine components may be obtained directly from the preparation of the diamino-polyurethane if a sufficient excess of arylene diamine is reacted with the glycol bischloroformate.

The compositions of this invention are prepared by mixing about chemically equivalent amounts of isocyanate component and amine component and allowing the isocyanato-amino group reaction to occur. Completion of this reaction is usually effected at elevated temperatures, so called "curing." Preferably, mixing is performed at the lowest temperature which provides reasonable viscosities. In the case of compositions containing high concentrations of isocyanato and amino groups it is especially desirable to blend the components at the lowest temperature consistent with good mixing because of the highly exothermic nature of such systems. As previously indicated this is important in preparing accurate castings for use in tooling and machine part applications. Because of the nature of the components employed in this invention, mixing temperatures as low as 20 to 30° C. may often be used without difficulty. Naturally, higher temperatures ranging up to 120° C. may be used if the application in question permits. It should be noted that the two components may be at different temperatures prior to mixing.

The relative amounts of the two components employed in preparing the compositions of the present invention should provide about equal numbers of isocyanato groups and amino groups. More exactly, from about 0.7 to 1.05 amino groups should be provided for each isocyanato group, with 0.9 up to 1.0 amino groups being preferred. If the number of amino groups per isocyanato group is less than 0.7 or greater than 1.05, the final compositions generally will be inferior in one or more physical properties.

Actual mixing of the amine and isocyanate components may be accomplished batch-wise or continuously. When mixing is effected batch-wise, either the isocyanate component may be added to the amine component or vice versa. If there is a large difference in the volume of the two components, mixing is usually best effected by adding the low volume component to the other component. The two components should be preweighed and adjusted to suitable temperatures before mixing is started so that the material can be brought together more or less instantaneously. Mixing may then be accomplished manually or mechanically, the latter being preferred and required when the scale of operation increases sufficiently. Once a uniform mixture has been formed, it should be cast promptly.

Cure of the compositions of the present invention may be effected at elevated temperatures ranging from about 80° C. to 140° C. The time required for curing may vary from about an hour at higher temperatures on up to 1 or 2 days for temperatures around 100° C. The time and temperature required for curing is also a function of the reactivity of the isocyanato and amino groups involved. In general, aliphatic isocyanato groups are less reactive than aromatic and ortho substituted amino groups are less reactive than unsubstituted amino groups. Cure may be started almost immediately after casting is complete in the case of small castings where shrinkage is not a problem. This is usually the case for soft compositions. In the case of compositions in the 65–95 Shore A hardness region, optimum vulcanizate properties are normally obtained by curing for 12 to 72 hours at 100–130° C. As the size and hardness of castings increases and in situations where shrinkage must be minimized, it is desirable to allow the isocyanato-amino group reaction to proceed at ambient temperatures to such an extent that heating after demolding causes no distortion. The article should be demolded prior to curing to avoid undue stress due to expansion within the mold. This is particularly important in the preparation of very hard polyurethane compositions for tooling applications. When the isocyanate component is high in aliphatic isocyanato groups, the fresh castings should be allowed to stand for a day or so at ambient temperatures before demolding and curing at elevated temperatures. For large castings requiring close tolerances, cure is best carried out at temperatures around 100° C. for as long as a day. It should be noted that the longer pot life associated with the isocyanate-amine compositions prepared according to this invention is particularly valuable in the preparation of large castings because rapid mixing becomes increasingly difficult on a large scale. With certain of these compositions it is possible to prepare several batches of polymer before exceeding the pot life of the first batch mixed. This provides a convenient way of preparing very large castings.

The preparation of highly accurate castings requires that cure shrinkage be minimized. This in turn requires that (1) the amine and isocyanate components be mixed at relatively low temperatures, (2) nearly all of the isocyanato groups be aliphatic, (3) the amino groups have low reactivity and (4) the heat of reaction be allowed to flow freely from the mold. These factors minimize the temperature in the interior of the casting at the time the casting sets firmly and this in turn minimizes shrinkage. With reference to the fourth factor, it should be noted that cooling of the mold can be employed, but temperatures below room temperatures should be used with care as extremes of temperature within the casting may set up undesirable stresses. Temperatures within the body of the casting can also be reduced by adding fillers such as finally divided steel and aluminum. Such fillers may reduce the physical properties of the casting as indicated previously. Many of the hard compositions included in this invention have the additional advantage of setting up firmly after the maximum temperature has been reached in the interior of the casting. This is important, for setting to final form while the interior temperature is still rising causes undue stresses in the casting and/or mold.

The examples which follow illustrate the preparation of a variety of the types of isocyanate-amine compositions according to the present invention and demonstrate advantages in processing characteristics. Parts and percents are by weight unless otherwise noted. The properties of the compositions in these examples are measured in accordance with the following ASTM procedures:

| | |
|---|---|
| Hardness | D–676 |
| Compression set | D–395 |
| Resilience, rebound | D–1054 |
| Izod impact resistant (½″ x ½″ Bar) | D–256 |
| Tear strength | D–470 |
| Abrasion resistance (Method B, NBS) | D–394 |
| Flexural modulus | D–790 |
| Flexural yield strength | D–790 |

Modulus at 100% extension ($M_{100}$), modulus at 300% extension ($M_{300}$), tensile strength at break ($T_B$), percent elongation at break are measured on Scott dumbbells (ASTM D 412) with an Instron testing machine. Crosshead speeds in in./min. used for each set of data is indicated by the number in parentheses following $T_B$.

Two types of methylenebis(4-cyclohexylisocyanate) are used in the examples which follow hereinafter. These are identified by their approximate trans-trans isomer content. These diisocyanates are obtained by phosgenation of diamines having the following isomer compositions:

| Isocyanate Designation | Composition of Corresponding Diamine |
|---|---|
| 20% trans-trans | 15-17% trans-trans.<br>4% cis-cis.<br>76% cis-trans. |
| 50% trans-trans | 50% trans-trans.<br>40% cis-trans.<br>8% cis-cis.<br>2% ortho isomers. |

Procedure A—Bischloroformate preparation

The glycol or mixture of glycols to be converted to bischloroformates is added uniformly over a 1–3 hour period to liquid phosgene maintained under reflux in an agitated glass reactor. About 1.5–3 moles of phosgene are provided for each equivalent of hydroxyl groups contained in the glycol or glycol mixture. Following the addition, the reaction mass is allowed to agitate under reflux for an additional ½ to 5 hours. Excess phosgene and by-product hydrogen chloride are removed by sweeping with dry nitrogen for about 20 hours. Once most of the phosgene has been removed, the temperature of the bischloroformate approaches room temperature and remains there for the duration of this step. Following nitrogen sweeping, the material may be used for the preparation of diamino-polyurethane.

Procedure B—Diamino-polyurethane preparation

Bischloroformate or bischloroformate mixture is added slowly with efficient agitation to an excess of diamine dissolved in benzene at temperatures below 45° C. Powdered calcium hydroxide is suspended in the diamine solution prior to the bischloroformate addition to remove hydrogen chloride as it is formed. Calcium hydroxide is also employed in excess of the hydrogen chloride calculated to be formed by the reaction of bischloroformate with diamine. At least 2 moles are used for each mole of bischloroformate. Following the addition of bischloroformate, the reaction mass is agitated at temperatures from 25° to 60° C. for about 1 to 5 hours to insure that the reaction goes to completion. The reaction mass is filtered to remove calcium hydroxide and insoluble salts. This filtration may be run at 40–60° C. to lower the viscosity of the reaction mass. Alternatively, the calcium hydroxide may be removed by converting it to water soluble salts by the addition of acid followed by extraction with water. Benzene is then removed by distillation, first at atmospheric pressure and then at reduced pressure. Final distillation conditions of 140° C. at a pressure of 10 mm. Hg are adequate for benzene removal. The residue of the distillation is the desired product.

Procedure C—Batch mixing of isocyanate and amine components

The isocyanate and amine components are weighed prior to actual mixing. The temperatures of the separate components are adjusted as desired in order to obtain a liquid having an acceptable viscosity. Either the isocyanate or the amine component is placed in an agitated vessel of appropriate size. If there is much difference in the volumes of the components, it is usually preferred to place the component having the larger volume in the agitated vessel. The other component is added to the agitated vessel as rapidly as possible and agitation is continued until a uniform mixture is obtained. This is then poured immediately into the molds which are to be filled. If difficulty is experienced due to the formation of bubbles within castings, it may be necessary to degas one or both of the components prior to mixing. This may be accomplished by agitating the components at reduced pressure. Degassing proceeds more rapidly if the components are heated in the range of 40–100° C. to lower their viscosity, but care must be taken to avoid the loss of low boiling material if such are present.

EXAMPLE 1

The bischloroformate of polytetramethyleneether glycol having a molecular weight of about 1000 is prepared by Procedure A. About 0.2 mole of this bischloroformate is reacted with 0.8 mole of 4,4′-methylenebis(2-chloroaniline) following Procedure B. The product, a diamine/diamino-polyurethane mixture, is a clear brown viscous liquid which is storage stable at room temperature. It has an amino group nitrogen content of 3.85%. Following Procedure C, an amine component of 5.96 parts of 4,4′-methylenebis(2-chloroaniline) and 8.04 parts of the above product are mixed and reacted with 100 parts of an isocyanate component which is a prepolymer. Both compolypropyleneether glycol (molecular weight 2000) and 0.7 mole of polytetramethyleneether glycol (molecular weight 2000) to 5.4 moles of a mixture of tolylene diisocyanate isomers (80% 2,4; 20% 2,6-). The addition of the glycols is made over a 2-hour period following the first additions during which the temperature is maintained at 75 to 85° C. Following the addition of the isocyanate component to the amine component, the temperature of the resulting mixture is maintained at 78 to 80° C. for 6 hours. This composition is cured for 3 hours at 100° C. After aging for 7 days at 25° C. and a relative humidity of 50%, the composition has the following physical properties:

| | | |
|---|---|---|
| $T_B$ | p.s.i | 2350 |
| $E_B$ | percent | 650 |
| $M_{100}$ | p.s.i | 400 |
| $M_{300}$ | p.s.i | 685 |
| $S_B$ | percent | 11 |
| Tear strength | p.l.i | 59 |
| Hardness, Durometer A | | 76 |
| Resilience, Yerzley | percent | 68.4 |
| Compression set B | do | 37 |

EXAMPLE 2

Following Procedure B, 2.0 moles of an isomer mixture of m-tolylene diamine (80% 2,4-; 20% 2,6-) is reacted with 1.0 mole of the bischloroformate prepared in Example 1. The resulting diamino-polyurethane is mixed at 100° C. with an equal weight of 4,4′-methylenebis(2-chloroaniline) to form a liquid amine component having an amino nitrogen content of 6.3%. Following Procedure C, 20.7 parts of this amine component, at 100° C., is mixed with 100 parts of an isocyanate component, also at 100° C., which is a prepolymer prepared by reacting 1.6 moles of tolylene-2,4-diisocyanate with 1.0 mole of polytetramethyleneether glycol (molecular weight 1000) at 80° C. for 4 hours. The resulting composition is cured for 3 hours at 100° C. and aged for 7 days at 25° C. and 50% relative humidity. The composition has the following properties:

| | | |
|---|---|---|
| $T_B$ | p.s.i | 3600 |
| $E_B$ | percent | 510 |
| $M_{100}$ | p.s.i | 640 |
| $M_{300}$ | p.s.i | 1200 |
| $S_B$ | percent | 4 |
| Tear strength | p.l.i | 47 |
| Hardness, Durometer A | | 86 |
| Resilience, rebound | percent | 35 |
| Compression set B | do | 33 |

EXAMPLE 3

Following Procedure B, 0.146 mole of the bischloroformate prepared in Example 1 is reacted with 0.2345 mole of 4,4′-methylenebis(N-methylaniline). The product is a colorless low-viscosity liquid having an amino nitrogen content of 1.2%. An amine component is prepared by mixing at 100° C., 100 parts of the above product with 34 parts of 4,4′-methylenebis(2-chloroaniline). The amine component is a liquid having an amino nitrogen content of 3.58%. Following Procedure C, 36.3 parts of this amine component is mixed with 100 parts of the isocyanate component used in Example 2. The mixing temperature is 70° C. The composition formed is cured for 5 hours at 100° C. and aged 7 days at 25° C. and 50% relative humidity. The composition has the following properties:

| | | |
|---|---|---|
| $T_B$ | p.s.i | 3150 |
| $E_B$ | percent | 600 |
| $M_{100}$ | p.s.i | 385 |
| $M_{300}$ | p.s.i | 575 |
| $S_B$ | percent | 10 |
| Tear strength | p.l.i | 47 |
| Hardness, Durometer A | | 75 |
| Resilience, Yerzley | percent | 71 |
| Compression set B | do | 40 |

EXAMPLE 4

A mixture of 1.0 mole of polytetramethyleneether glycol and 2.0 moles of butanediol-1,4 is converted to the corresponding bischloroformates following Procedure A. About 0.1 mole of bischloroformate mixture is reacted with 0.6 mole of 4,4′-methylenebis(2-chloroaniline) by Procedure B to yield a dark brown viscous liquid having an amino nitrogen content of 2.89%. An amine component is prepared by mixing equal parts of the above product and additional 4,4′-methylenebis(2-chloroaniline). Following Procedure C, 42.7 parts of this amine component is mixed with 100 parts of an isocyanate component which is a prepolymer prepared by reacting 4.0 moles of a mixture of tolylene diisocyanate isomers (80% 2,4-; 20% 2,6-) with a mixture of 1.0 mole of butanediol-1,3 and 1.0 mole of polytetramethyleneether glycol (molecular weight 1000) at 80° C. for 4 hours. A mixing temperature of 80° C. for the two components is used. The resulting composition is cured for 3 hours at 100° C. and aged for 7 days at 25° C. and 50% relative humidity. It is a hard polyurethane having the following properties:

| | | |
|---|---|---|
| $T_B$ | p.s.i | 7,000 |
| $E_B$ | percent | 260 |
| $M_{100}$ | p.s.i | 42 |
| Tear strength | p.l.i | 124 |
| Hardness, Durometer D | | 71 |
| Resilience, rebound | percent | 33 |
| Compression set A | do | 8.3 |
| Flexural modulus | p.s.i | 66,500 |

EXAMPLE 5

This example illustrates the preparation of a diamine/diamino-polyurethane blend based on a polyester. A mixture of glutaric anhydride (1080 pts.), adipic acid (625 pts.), succinic acid (625 pts.) and ethylene glycol (1770 pts.) is heated for about 14 hours under a nitrogen atmosphere until 824 pts. of distillate consisting of water and ethylene glycol is collected. The final pot temperature reached is 235° C. The resulting polyester has a hydroxyl number of 162, an acid number of 0.2, and a calculated molecular weight of 694. This polyester is converted to a bischloroformate by following Procedure A. The above bischloroformate (0.5 M, 450 pts.) is added to an agitated solution of 4,4′-methylenebis(2-chloroaniline) 401 pts., 1.5 moles, in benzene to form a diaminopolyurethane by Procedure B. An amine component is prepared by mixing equal parts of this diamino-polyurethane and 4,4′-methylenebis(2-chloroaniline). Following Procedure C, a composition is prepared by mixing 18.5 parts of amine component with 100 parts of the prepolymer prepared in Example 2. The mixing is carried out at 70° C. After curing for 4 hours at 100° C. and aging for 7 days at 25° C. and 50% relative humidity, the composition has the following physical properties:

| | | |
|---|---|---|
| $T_B$ | p.s.i | 3800 |
| $E_B$ | percent | 460 |
| $M_{100}$ | p.s.i | 805 |
| $M_{300}$ | p.s.i | 1400 |
| $S_B$ | percent | 4 |
| Tear strength | p.l.i | 78 |
| Hardness, Durometer A | | 86 |
| Resilience, rebound | percent | 38 |
| Compression set B | do | 36 |

EXAMPLE 6

A mixture of 2.0 moles of diethylene glycol and 1.0 mole of polytetramethyleneether glycol, number average molecular weight about 1000, is converted to the corresponding bischloroformates by Procedure A. The bischloroformates are converted to a diamino-polyurethane by reacting 2.7 moles of 3,3'-dichlorobenzidine with each mole of bischloroformate mixture by Procedure B. The resulting product contains 15.4% free 3,3'-dichlorobenzidine and 4.45% amino nitrogen.

A composition is prepared, via Procedure C, by reacting about 100 parts of the above amine component with an isocyanate component obtained by mixing 39.6 parts of 20% trans-trans methylenebis(4-cyclohexylisocyanate) and 39.4 parts of a prepolymer which in turn is prepared by reacting 2 moles of tolylene-2,4-diisocyanate with 1 mole of polytetramethyleneether glycol, number average molecular weight 1000. Mixing is effected at 60° C. Curing is performed for 24 hours at room temperature and 24 hours at 100° C.

After aging for 7 days at 25° C. and 50% relative humidity, the composition has the following physical properties:

| | | |
|---|---|---|
| $T_B$ | p.s.i. | 6,600 |
| $E_B$ | percent | 140 |
| Flexural modulus | p.s.i. | 215,000 |
| Hardness, Shore D | | 80 |
| Izod impact strength, notched | ft. lb./in. | 1.16 |
| NBS abrasion | percent | 544 |

EXAMPLE 7

About 0.232 mole of the bischloroformate of polytetramethyleneether glycol, prepared as in Example 1, is reacted with a mixture of 0.464 mole of 4-chlorophenylene-1,3-diamine and 0.232 mole of 4,4'-methylenebis(2-chloroaniline) following Procedure B. The product has an amino nitrogen content of 3.4% and a Brookfield viscosity of 6450 cps. at 40° C. An amine component is prepared by blending 23.1 parts of this product with 5.2 parts of 4,4'-methylenebis(2-chloroaniline). Following Procedure C, the amine component is reacted with 100 parts of an isocyanate component which is the prepolymer prepared in Example 2. The components are mixed at 80° C. After curing for 3 hours at 100° C. and aging for 7 days at 25° C. and 50% relative humidity, the composition has the following properties:

| | | |
|---|---|---|
| $T_B$ | p.s.i. | 4350 |
| $E_B$ | percent | 560 |
| $M_{100}$ | p.s.i. | 605 |
| $M_{300}$ | p.s.i. | 1020 |
| $S_B$ | percent | 4 |
| Tear strength | p.l.i. | 62 |
| Hardness, Durometer A | | 83 |
| Resilience, rebound | percent | 43 |
| Compression set B | do | 33 |
| NBS abrasion | do | 111 |

EXAMPLE 8

A mixture of 1.5 moles of diethylene glycol and 1.0 mole of polytetramethyleneether glycol, number average molecular weight of 1000, is converted to the corresponding bischloroformates by Procedure A. Following Procedure B, the bischloroformates are converted to diamino-polyurethanes by reacting 3.05 moles of 4,4'-methylenebis(2-fluoroaniline) with each mole of bischloroformate. This product has an amino nitrogen content of 5.05% and a Brookfield viscosity of 14,750 cps. at 40° C. By adding additional 4,4'-methylenebis(2-fluoroaniline) to the diamino-polyurethane an amine component containing 36.7% free 4,4'-methylenebis(2-fluoroaniline) and 8.0% amino nitrogen is prepared.

About 100 parts of this amine component is mixed with an isocyanate component obtained by mixing 48.0 parts of 20% trans-trans methylenebis(4-cyclohexylisocyanate) and 76.8 parts of a prepolymer which in turn is prepared by reacting 2 moles of tolylene-2,4-diisocyanate with 1 mole of polytetramethyleneether glycol, number average molecular weight of 1000. Mixing is effected at 50° C. following Procedure C. The amounts employed supply 0.96 amino group for each isocyanato group. Curing of cast test pieces is accomplished by holding at room temperature for 24 hours and at 100° C. for an additional 24 hours. The composition after aging for 7 days at 25° C. and 50% relative humidity has the following properties:

| | | |
|---|---|---|
| $T_B$ (1) | p.s.i. | 6,900 |
| $M_{100}$ | p.s.i. | 5,750 |
| $E_B$ | percent | 140 |
| Flexural modulus | p.s.i. | 192,000 |
| Flexural yield strength | | 9,800 |
| Izod impact strength, notched | ft. lb./in. | 5.0 |
| NBS abrasion | percent | 1,087 |
| Hardness, Shore D | | 80 |

The required 4,4'-methylenebis(2-fluoroaniline) may be prepared by the usual aniline-formaldehyde condensation for preparing methylene dianiline. The material used in this example is prepared by adding at room temperature a mole of 37% formaldehyde to an aqueous solution of two moles of the acid sulfate of 2-fluoroaniline, heating to about 90° C. to rearrange the initial condensation product, neutralizing the acid and separating the organic material. The crude diamine is purified by distillation at reduced pressure yielding a colorless product melting at 65–67° C.

EXAMPLE 9

This example illustrates the use of an amine component containing the minimum of 0.20 equivalents of diamines per equivalent of the amine component.

About 1.0 mole of the bischloroformate of polytetramethyleneether glycol, prepared by the method of Example 1, is reacted with 2.0 moles of 4,4'-methylenebis(2-chloroaniline) following Procedure B. The product contains 1.8% amino nitrogen and is essentially free of unreacted 4,4'-methylenebis(2-chloroaniline). A mixture of 100 parts of this diaminopolyurethane and 4.29 parts of 4,4'-methylenebis(2-chloroaniline) is prepared by heating the two materials to 100° C. and agitating. About 100 parts of the resulting amine component is reacted at 70° C. with 74.5 parts of prepolymer prepared in Example 4 following Procedure C. The composition is cured for 3 hours at 100° C. and aged 7 days at 25° C. and 50% relative humidity. It has the following physical properties:

| | | |
|---|---|---|
| $T_B$ | p.s.i. | 7100 |
| $E_B$ | percent | 420 |
| $M_{100}$ | p.s.i. | 900 |
| $M_{300}$ | p.s.i. | 2500 |
| $S_B$ | percent | 6 |
| Tear strength | p.l.i. | 86 |
| Hardness, Durometer A | | 89 |
| Resilience, rebound | percent | 35 |
| Compression set B | do | 29 |

EXAMPLE 10

This example illustrates the use of an amine component containing the minimum amount of diamino-polyurethane; namely, 10% by weight of the amine component.

An amine component is prepared by mixing at 120° C., 9 parts of 4,4'-methylenebis(2-chloroaniline) and 1 part of the diamino-polyurethane prepared in Example 9. The hot mixture is allowed to cool while being agitated. The first sign of crystallization is observed at 72° C. and slow crystallization continues as the temperature drops. When straight 4,4'-methylenebis(2-chloroaniline) is melted and cooled in the same fashion, rapid crystallization takes place at 85° C. A composition is prepared by mixing at 80° C., 20.52 parts of the above amine component and 100 parts of the prepolymer prepared in Example 6. After curing for 3 hours at 100° C. and aging for 7 days at 25° C. and 50% relative humidity, the composition has the following properties:

| | | |
|---|---|---|
| $T_B$ | p.s.i. | 5800 |
| $E_B$ | percent | 460 |
| $M_{100}$ | p.s.i. | 1700 |
| $M_{300}$ | p.s.i. | 3100 |
| $S_B$ | percent | 6 |
| Tear strength | p.l.i. | 135 |
| Hardness, Durometer A | | 97 |
| Resiliencee, rebound | percent | 42 |
| Compression set B | do | 38 |

EXAMPLE 11

A mixture of polyethylene adipate glycol (1840 g., 1.0 mole) and 4,4'-methylenebis(phenyl isocyanate) (500 g., 2.0 moles) is heated at 100–120° C. for about two hours with stirring under a nitrogen atmosphere. The prepolymer obtained has an isocyanato group content of 3.56%. This prepolymer is used as an isocyanate component with the following amine components to form three compositions:

Amine component 11-A

Identical to the amine component used in Example 5.

Amine component 11-B

A bischloroformate is prepared from diethylene glycol following Procedure A.

The liquid bischloroformate (1.47 moles) is reacted with 4,4'-methylenebis(2-chloroaniline) (3.39 moles) using Procedure B. The product is a resinous mass at room temperature which can be handled as a liquid at temperatures of 60° C. or higher. The product has an amino nitrogen content of 5.0%.

Amine component 11-C

A mixture of the diamino-polyurethane of Example 9 (100 pts.) and 4,4'-methylenebis(2-chloroaniline) (25.8 parts) is heated at 100° C. with stirring until a homogeneous mixture is obtained. The blend has an amino nitrogen content of 3.67%.

The acompanying table shows the amounts of each of the amine components used per 100 parts of the prepolymer of this Example. All compositions are mixed at 100° C. using Procedure C, cured 4 hours at 120° C., and aged 7 days at 25° C. and 50% relative humidity before testing. Physical properties of the resulting compositions are also tabulated.

| | Composition | | |
|---|---|---|---|
| | 11-1 | 11-2 | 11-3 |
| Prepolymer, parts | 100 | 100 | 100 |
| Amine Component 11-A, parts | 34.0 | | |
| Amine Component 11-B, parts | | 22.7 | |
| Amine Component 11-C, parts | | | 31.0 |
| $T_B$, p.s.i. | 7,000 | 7,300 | 4,700 |
| $E_B$, percent | 700 | 630 | 680 |
| $M_{100}$, p.s.i. | 510 | 630 | 460 |
| $M_{300}$, p.s.i. | 910 | 1,200 | 800 |
| $S_B$, percent | 8 | 8 | 15 |
| Tear Strength, p.l.i. | 82 | 92 | 75 |
| Hardness, Durometer A | 81 | 87 | 80 |
| Resilience, Rebound, percent | 29 | 32 | 40 |
| Compression Set B, percent | 40 | 34 | 41 |
| NBS Abrasion | 119 | 127 | |

EXAMPLE 12

This example ilustrates the preparation of a composition containing a minor amount of a trifunctional compound.

A mixture of 1 mole of butanediol-1,3, 0.1 mole of 1,1,1-trimethylolpropane and 1 mole of polytetramethyleneether glycol, molecular weight 1000, is converted to chloroformates by Proceudre A. Each equivalent of the chloroformate mixture is reacted with 3.05 equivalents of 4,4'-methylenebis(2-chloroaniline) following Procedure B. The resulting mixture of polyaminourethanes and 4,4'-methylenebis(2-chloroaniline) contains 14.9% free 4,4'-methylenebis(2-chloroaniline) and 3.9% of amino nitrogen. About 100 parts of this amine component is mixed with 38.35 parts of 50% trans-trans methylenebis(4-cyclohexylisocyanate), both at 80° C. following Procedure C. These amounts provide 0.95 equivalents of amino groups per equivalent of isocyanato groups. Test slabs are cast and cured for 3 hours at 130° C. After aging 7 days at 25° C. and 50% relative humidity, the composition has the following properties:

| | | |
|---|---|---|
| $T_B$ (20) | p.s.i. | 8,500 |
| $E_B$ | percent | 30 |
| Flexural modulus | p.s.i. | 255,000 |
| Hardness, Shore D | | 85 |
| Izod impact strength, notched | ft. lb./in. | 2.26 |
| NBS abrasion | percent | 176.2 |
| Compression set A (1350 p.s.i., 70° C., 22 hours) | percent | 2.9 |
| Resilience, rebound | do | 55 |

EXAMPLE 13

The bischloroformate of polytetramethyleneether glycol having a molecular weight of about 1000 is prepared by Procedure A. A mole of the bischloroformate is reacted with 2.0 moles of 4,4'-methylenebis(2-chloroaniline) following Procedure B. The diamino-polyurethane produced is mixed with 4,4'-methylenebis(2-chloroaniline) to give a mixture containing 13.1% 4,4'-methylene(2-chloroaniline) which corresponds to an amino nitrogen content of 2.94% for the mixture. About 100 parts of this amine component at 50° C. is mixed with 28.7 parts of 50% trans-trans methylenebis(4-cyclohexylisocyanate), also at 50° C., following Procedure C. The amine provided corresponds to 0.97 equivalents of amino groups per equivalent of isocyanato groups. Test slabs are cast and cured for 18 hours at 130° C. After aging at 25° C. and 50% relative humidity for 7 days, the composition has the following properties:

| | | |
|---|---|---|
| $T_B$ (20) | p.s.i. | 5700 |
| $E_B$ | percent | 150 |
| $M_{100}$ | p.s.i. | 4600 |
| Hardness, Shore D | | 66 |
| Izod impact strength, notched | ft. lb./in. | 7.37 |
| NBS abrasion | percent | 684 |
| Compression set A (1350 p.s.i., 70° C., 22 hours) | percent | 15.7 |
| Resilience, rebound | do | 52 |

EXAMPLE 14

A mixture of bischloroformates is prepared from a mixture of 4 moles of diethylene glycol and 1 mole of polytetramethyleneether glycol, molecular weight about 1000, following Procedure A. Each mole of bischloroformate mixture is reacted with 2.28 moles of 4,4'-methylenebis(2-chloroaniline) following Procedure B. The resulting mixture diamino-polyurethane/4,4'-methylenebis(2-chloroaniline) contains 8.0% 4,4'-methylenebis(2-chloroaniline) and analyzes for an amine nitrogen content of 4.1%. About 100 parts of this amine component is mixed with 42.8 parts of 50% trans-trans methylenebis(4-cyclohexylisocyanate), both at 80° C., following Procedure C. Test slabs are cast and cured for 3 hours at 130° C. After aging at 25° C. and 50% relative humidity for 7 days, the composition has the following properties:

| | |
|---|---|
| $T_B$ (20) p.s.i. | 8,500 |
| $E_B$ percent | 10 |
| Flexural modulus p.s.i. | 360,000 |
| Hardness, Shore D | 87 |
| Izod impact strength, notched ft. lb./in. | 1.8 |
| NBS abrasion percent | 172.5 |
| Compression Set A (1350 p.s.i., 70° C., 22 hours) do | 1.6 |
| Resilience, rebound do | 33 |

EXAMPLE 15

Polypropyleneether glycol, molecular weight 425, is converted to the corresponding bischloroformate by Procedure A. About 1 mole of this bischloroformate is reacted with 2.36 moles of 4,4'-methylenebis(2-chloroaniline) using the process of Procedure B. The diamino-polyurethane produced contains 7.75% of 4,4'-methylenebis(2-chloroaniline) and has an amino nitrogen content of 3.35%. About 100 parts of this amine component is reacted with 36.5 parts of 50% trans-trans methylenebis(4-cyclohexylisocyanate), both at 80° C., following Procedure C. Test slabs are cast and cured for 3 hours at 130° C. After aging at 25° C. and 50% relative humidity for 7 days, the composition has the following properties:

| | |
|---|---|
| $T_B$ (20) p.s.i. | 7,650 |
| $E_B$ percent | 20 |
| Flexural modulus p.s.i. | 440,000 |
| Hardness, Shore D | 87 |
| Izod impact strength, notched ft. lb./in. | 1.69 |
| NBS abrasion percent | 167 |
| Compression set A (1350 p.s.i., 70° C., 22 hours) do | 7.5 |
| Resilience, rebound do | 7.5 |

EXAMPLE 16

A diamine/diamino-polyurethane mixture is prepared by reacting the bischloroformate of polytetramethyleneether glycol, molecular weight 1000, with an excess of 4,4'-methylenebis(2-chloroaniline). The amine component so produced contains about 7.6% of free 4,4'-methylenebis(2-chloroaniline) and has an amino nitrogen content of 2.5%. Following Procedure C, 100 parts of this amine component is mixed with 15.5 parts of tolylene-2,4-diisocyanate at 45° C. After curing for 2.5 hours at 100° C. and aging for 7 days at 25° C. and 50% relative humidity, the composition has the following properties:

| | |
|---|---|
| $T_B$ p.s.i. | 4075 |
| $E_B$ percent | 300 |
| $M_{100}$ p.s.i. | 2200 |
| Tear strength (D–470) | 136 |
| Resilience, Bashore | 37 |
| Hardness, Shore D | 62 |

EXAMPLE 17

This example illustrates the changes in properties which can be provided by curing a given isocyanato component with a series of amine components differing only in that they contain increasing proportions of arylene diamine. The isocyanate component used is the product obtained by reacting 1.6 moles of tolylene-2,4-diisocyanate with 1.0 mole of polytetramethyleneether glycol, molecular weight about 1000, for 4 hours at 80° C. The amine components are mixtures prepared from 4,4'-methylenebis(2-chloroaniline) and diamino-polyurethane obtained by reacting 1.0 mole of the bischloroformate of polytetramethyleneether glycol (molecular weight about 1000) with two moles of 4,4'-methylenebis(2-chloroaniline). The diamino-polyurethane is prepared by following Procedure B. Four compositions included in this invention are prepared using the following amounts of the materials described above. A fifth composition using only 4,4'-methylenebis(2-chloroaniline) as the amine component is included as a control.

| | 17-A | 17-B | 17-C | 17-D | Control |
|---|---|---|---|---|---|
| Isocyanate Component, pts. | 100 | 100 | 100 | 100 | 100 |
| Amine Component, pts.: | | | | | |
| 4,4' methylenebis(2 chloroaniline) | 5.1 | 6.28 | 8.14 | 9.02 | 11.95 |
| Diamino polyurethane | 40.0 | 32.3 | 22.2 | 17.0 | |

The compositions are prepared by Procedure C. Mixing is effected at 80–100° C. and the compositions are cured for 3 hours at 100° C. After aging for 7 days at 25° C. and 50% relative humidity, the compositions have the following properties:

| | 17-A | 17-B | 17-C | 17-D | Control |
|---|---|---|---|---|---|
| $T_B$, p.s.i. | 3,200 | 2,650 | 3,050 | 3,600 | 5,000 |
| $E_B$, percent | 510 | 480 | 500 | 490 | 500 |
| $M_{100}$, p.s.i. | 350 | 475 | 570 | 650 | 890 |
| $M_{300}$, p.s.i. | 760 | 910 | 1,080 | 1,290 | 1,610 |
| $S_B$, percent | 7 | 3 | 5 | 5 | 4 |
| Tear Strength (D-470) | 42 | 38 | 48 | 56 | 78 |
| Comp. Set B, percent | 50 | 20 | 12 | 26 | 30 |
| Resilience, Yerzley, percent | 66.7 | 70.8 | | | |
| Resilience, Bashore, percent | | | 43 | 43 | 43 |
| Hardness, Shore A | 76 | 80 | 83 | 85 | 90 |

The tabulated properties clearly illustrate that an increasing proportion of the straight arylene diamine in the amine component yields compositions having increased $M_{300}$, tear strength, and hardness.

EXAMPLE 18

This example illustrates the improved processing characteristics and low shrinkage provided by hard compositions of this invention. This compositions are ideally suited for tooling applications.

Thirty pound castings are prepared from a composition (18-B) included by the present invention and a control composition (18-A) employing a standard curing agent. Heavy cardboard containers measuring 9.75 in. in diameter and 8.5 in. in height are used as molds. A calibrated thermocouple connected to a recorder is positioned as closely as possible to the center of the cardboard containers so that the temperature of the casting can be measured as curing proceeds. Mixing is carried out on a 15 lb. scale in a 2 gallon pail using a ½ H.P. "Lightening" mixer. Two batches are prepared in immediate sequence to fill the cardboard molds.

The materials used in preparing the castings, processing temperatures and viscosity of the isocyanate component are presented in the following table. The table also includes information on processing characteristics and shrinkage.

| Isocyanate Component | Control, 18-A | 18-B |
| --- | --- | --- |
| Prepolymer [1] | 100 | 100 |
| 50% trans-trans Methylenebis(4-cyclohexylisocyanate) | 25 | 25 |
| Amine Component: | | |
| 4,4'-Methylenebis(2-chloroaniline) | 43 | |
| Diamino-polyurethane/diamine mixture [2] | | 86 |
| Isocyanate Component: | | |
| Mixing Temperature, °C | 30 | 30 |
| Viscosity, cps. at 30° C | 3,800 | 3,800 |
| Mixing Time, min | 2 | 2 |
| Working Time, min | 20 | 90 |
| Critical Gel Time, hrs | 5.5 | 9 |
| Critical Gel Temp., °C | 70 | 26.5 |
| Shrinkage, Estimated, percent | 0.16 | 0.03 |

[1] Reaction product of 2 moles of 2,4-tolylene diisocyanate and 1 mole of polytetramethyleneether glycol, molecular weight 1,000.
[2] Reaction product of a mixture of 1 mole of the bischloroformate of polytetramethylene ether glycol 1,000 and 1.5 moles of the bischloroformate of diethylene glycol with 8.8 moles of 4,4'-methylenebis(2-chloroaniline) prepared following Procedures A and B, plus additional 4,4'-methylenebis(2-chloroaniline) to provide an amino nitrogen concentration of 5.25%.

Working time has its usual meaning and represents the time after mixing that a given composition remains sufficiently fluid to flow readily of its own weight. Critical gel time is the time required after casting for a given composition to gel sufficiently so that it is dimensionally stable, even if subjected to oven cure at temperatures above those existing at the critical gel point. It is determined by observation of the resistance of the casting to cutting and denting. The critical gel temperature is the temperature in the center of the casting which exists at the critical gel time. If the casting sets to its final dimensions at an elevated temperature, it will shrink on being cooled to room temperature to a degree which is roughly proportional to the difference between the critical gel temperature and room temperature. Shrinkage is estimated on the basis of measurements made on castings prepared in an accurately machined mold having a 4 in. square cross section and a depth of 8 in.

The data in the table clearly show the advantage provided by the composition employing a conventional diamine curing agent.

As many widely different embodiments of this invention may be made without departing from the spirit and scope thereof, it is to be understood that this invention is not limited to the specific embodiments thereof except as defined in the appended claims.

What is claimed is:

1. In the process of reacting an organic difunctional isocyanato-terminated component with a difunctional amino-terminated component to form a polyurethane/polyurea product having a number average molecular weight for units between urea groups in the polymer chain constituting said product of from about 250 to about 2500, the improvement comprising obtaining said product by contacting and reacting said difunctional isocyanato-terminated component with a difunctional amino-terminated component consisting essentially of arylene diamine having a pKb of at least 8.7 and a diamino-polyurethane having the formula

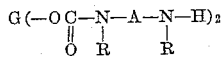

wherein —G— is a bivalent radical obtained by removing the hydroxyl groups of a glycol, —A— is an inert biradical obtained by removing the amino groups from a diamine, with the proviso that the terminal amino groups of said diamino-polyurethane are aromatic, and R is selected from the group consisting of hydrogen and $C_1$-$C_4$ alkyl, with said amino-terminated component containing not less than about 10% of its weight of said diamino-polyurethane and at least 0.20 equivalents of arylene diamine of pKb of at least 8.7 per equivalent of said amino-terminated component, with the proviso that the molecular weights of said isocyanato-terminated component and said amino-terminated component are such that said number average molecular weight for said units between urea groups is obtained.

2. In the process as recited in claim 1 wherein said isocyanato-terminated component is a simple compound.

3. In the process as recited in claim 2 wherein said isocyanato-terminated component is selected from the group consisting of tolylene diisocyanate, methylenebis (4-cyclohexylisocyanate), and methylenebis(4-phenylisocyanate).

4. In the process as recited in claim 1 wherein said isocyanato-terminated component is a prepolymer prepared by reacting a glycol with an excess of a simple diisocyanate compound.

5. In the process as recited in claim 4 wherein at least 1.4 isocyanato groups supplied by said isocyanate compound are present for each hydroxyl group supplied by said glycol.

6. In the process as recited in claim 1 wherein from 0.7 to 1.05 equivalents of said amino-terminated component are supplied for each equivalent of said isocyanato-terminated component.

7. In the process as recited in claim 1 wherein said glycol is polytetramethyleneether glycol.

8. In the process as recited in claim 1 wherein said glycol is a mixture of polytetramethyleneether glycol and diethylene glycol.

9. In the process as recited in claim 1 wherein said arylene diamine having a pKb of at least 8.7 is 4,4'-methylenebis(2-chloroaniline).

10. In the process as recited in claim 1 wherein said amino-terminated component is prepared by reacting said glycol as its bischloroformate with an excess of arylene diamine having a pKb of at least 8.7 in the presence of an acid acceptor.

11. In the process of chain extending a difunctional isocyanato-terminated prepolymer with arylene diamine to form a polyurethane/polyurea product having a number average molecular weight for units between urea groups in the polymer chain constituting said product of from 250 to 2500, the improvement comprising obtaining said chain extending by contacting and reacting said prepolymer with a fluid composition consisting essentially of arylene diamine having a pKb of at least 8.7 and a diamino-polyurethane having the formula

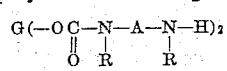

wherein —G— is a bivalent radical obtained by removing the hydroxyl groups of a glycol, —A— is an inert arylene biradical obtained by removing the amino group from an arylene diamine, and R is selected from the group consisting of hydrogen and $C_1$-$C_4$ alkyl, with said composition containing not less than about 10% of its weight of said diamino-polyurethane and at least 0.20 equivalents of arylene diamine of pKb of at least 8.7 per equivalent of said composition, with the proviso that the molecular weights of said isocyanato-terminated prepolymer and said composition are such that said number average molecular weight for said units between urea groups is obtained, and obtaining as a result thereof said polyurethane/polyurea product.

12. In the process of chain-extending a difunctional isocyanato-terminated prepolymer with arylene diamine to form a solid polyurethane polyurea product, the improvement comprising obtaining said chain extending by contacting and reacting said isocyanato-terminated prepolymer with a fluid composition consisting essentially of arylene diamine having a pKb of at least 8.7 and a diamino-polyurethane having the formula

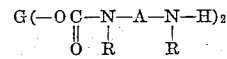

wherein —G— is a bivalent radical obtained by removing the hydroxy groups of a glycol, —A— is an inert biradical obtained by removing the amino groups from a diamine, with the proviso that the terminal amino groups of said diamino-polyurethane are aromatic, and R is selected from the group consisting of hydrogen and $C_1$–$C_4$ alkyl, with said composition containing not less than about 10% of its weight of said diamino-polyurethane and at least 0.20 equivalents of arylene diamine of pKb of at least 8.7 per equivalent of said composition, and obtaining as a result thereof said polyurethane/polyurea product.

13. A process comprising contacting and reacting a difunctional isocyanato-terminated component with from 0.7 to 1.05 equivalents per equivalent of said component of an amino-terminated component consisting essentially of arylene diamine having a pKb of at least 8.7 and a diamino-polyurethane having the formula

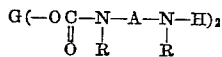

wherein —G— is a bivalent radical obtained by removing hydroxyl groups of a glycol, —A— is an inert arylene biradical obtained by removing the amino groups from an arylene diamine, and R is selected from the group consisting of hydrogen and $C_1$–$C_4$ alkyl, with said amino-terminated component containing not less than about 10% of its weight of said diamino-polyurethane and at least 0.20 equivalents of arylene diamine of pKb of at least 8.7 per equivalent of said amino-terminated component, with the proviso that the molecular weights of said components are such that the number average molecular weight for units between urea groups in the resultant polyurethane/polyurea polymer is from 250 to 2500, and obtaining as a result said polymer.

14. The polyurethane/polyurea polymer produced by the process of claim 13.

15. A fluid composition consisting essentially of at least 10% by weight of diamino-polyurethane having the formula

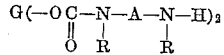

wherein —G— is a bivalent radical which may be obtained by removing the hydroxyl groups of a glycol, —A— is an inert biradical which may be obtained by removing the amino groups from a diamine, with the proviso that the terminal amino groups of said diamino-polyurethane are aromatic, and R is selected from the group consisting of hydrogen and $C_1$–$C_4$ alkyl; and at least 0.20 equivalents of a arylene diamine having a pKb of at least 8.7 per amine equivalent of said composition.

References Cited

UNITED STATES PATENTS 2,888,439   5/1959   Simons _____ 260—77.5

FOREIGN PATENTS 573,724   4/1959   Canada.

GEORGE F. LESMES, *Primary Examiner.*

MURRY TILLMAN, *Examiner.*

P. LIEBERMAN, *Assistant Examiner.*